April 28, 1953     B. M. ALTWIES     2,636,227

WINDOW

Filed Dec. 6, 1948     4 Sheets-Sheet 1

Inventor:
B. M. ALTWIES,
By Henry H. Snelling
Attorney

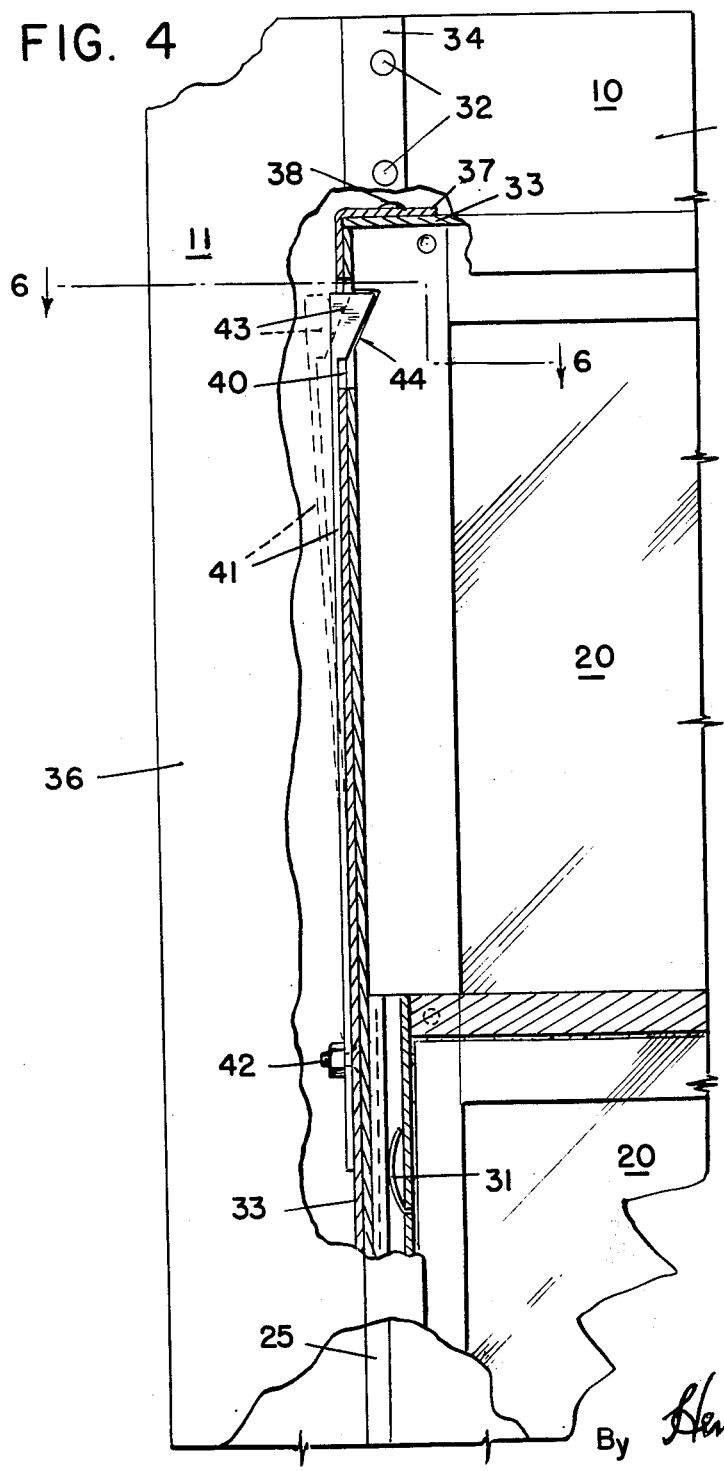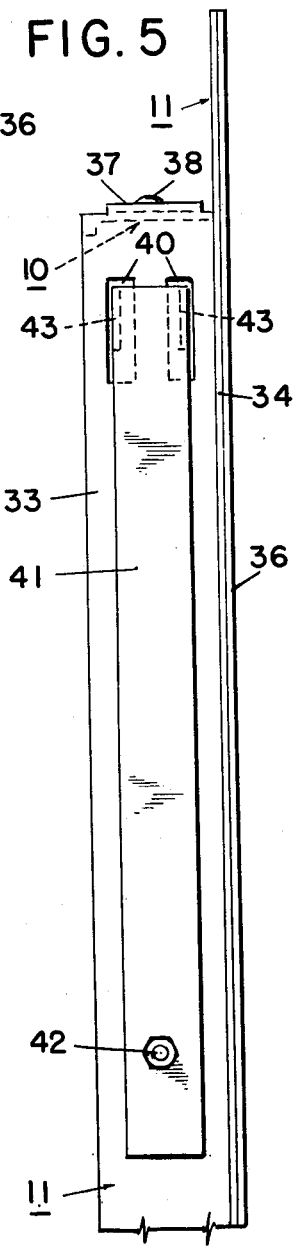

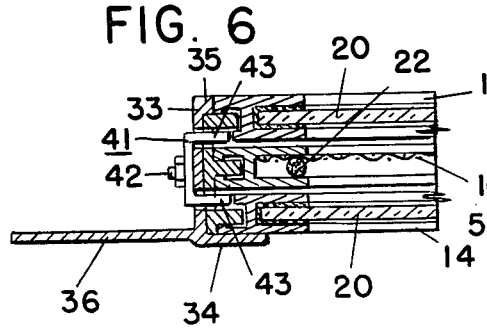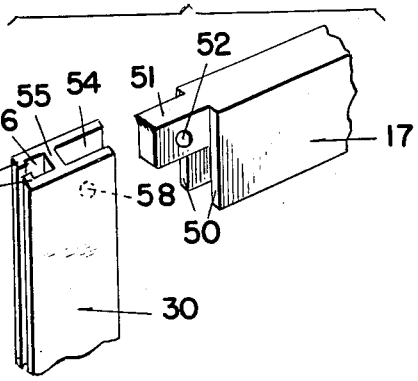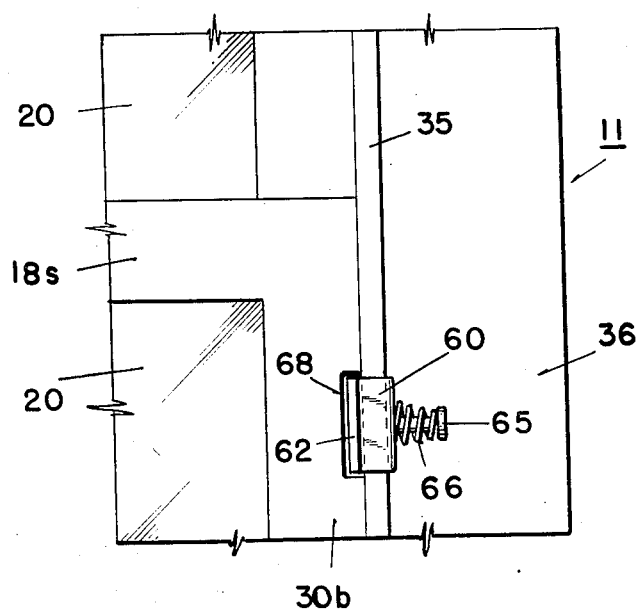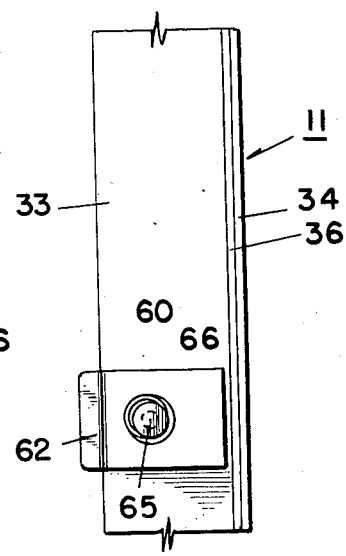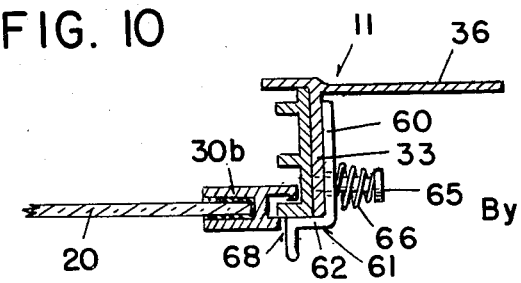

April 28, 1953      B. M. ALTWIES      2,636,227
WINDOW
Filed Dec. 6, 1948      4 Sheets-Sheet 4
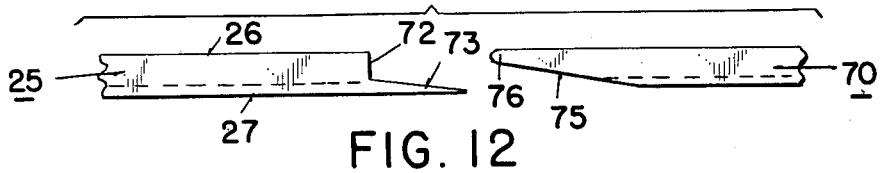
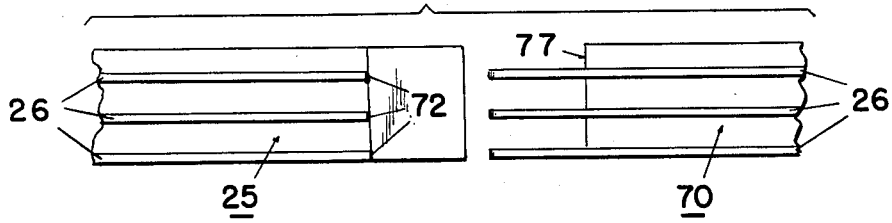
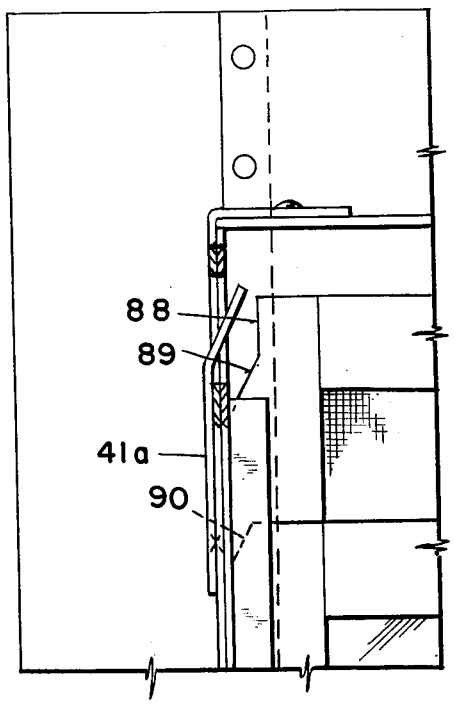
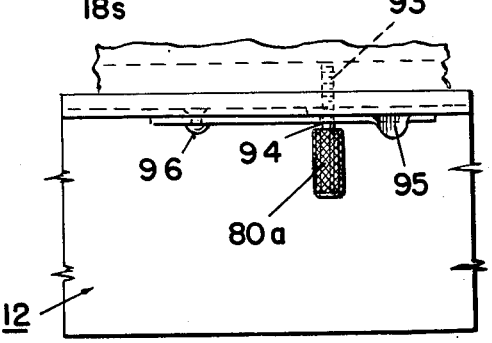
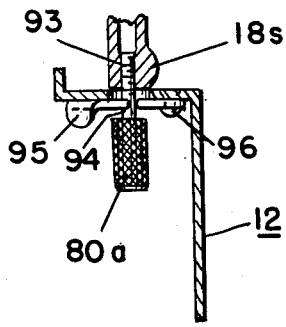
Inventor:
B. M. ALTWIES,
By Henry H. Snelling
Attorney Patented Apr. 28, 1953

2,636,227

UNITED STATES PATENT OFFICE 2,636,227

WINDOW

Benjamin M. Altwies, Fostoria, Ohio

Application December 6, 1948, Serial No. 63,800

2 Claims. (Cl. 20—52.2)

This invention relates to windows and has for its principal object the provision of a unit that can readily be placed in position in the window opening of a building and may carry two or more sashes preferably with metal frames in which the operation of the sashes is more convenient and positive and in which any or all of the sashes may readily be removed by one not familiar with tools.

An important object of the invention is to provide an improved ribbed track, one portion of which may be permanently secured in place and the other may be held solely by the window frame and the sashes. A further object is to provide a screen sash so located that it can readily be moved from the usual summer position to a storage space in the window unit and the upper sash may be latched in normal raised position unaffected by the raising or lowering of the screen sash. An incidental object is to provide a spring latch for each of the two glazed sashes for convenient locking of either or both of these sashes in normal position with means for readily and easily releasing either sash.

Other objects of the invention concern details all of which together provide a more satisfactory window, one which will give long service without any attention. Still other objects of the invention are pointed out in the claims.

In the drawings:

Figure 4 is a corner elevation partly broken away.

Figure 5 is a side view of Figure 4.

Figure 6 is a section on line 6—6 of Figure 4.

Figure 7 is a perspective view of a stile and a rail before assembly.

Figure 16:
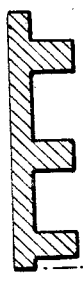

Figure 8 is an inside elevation of the lower sash lock; Figure 9 is a side elevation of the lower sash lock; Figure 10 is a horizontal section view thru the lower sash lock; Figure 11 is an edge view of the track; Figure 12 is a side view of the track; Figure 13 shows a modified form of leaf spring and the cutaway at the top of the screen sash; Figure 14 illustrates a modified form of pull for the screen sash; Figure 15 is a section thru the modified form which is shown in elevation; Figure 16 shows a modified form of triple track.

Figure 1:
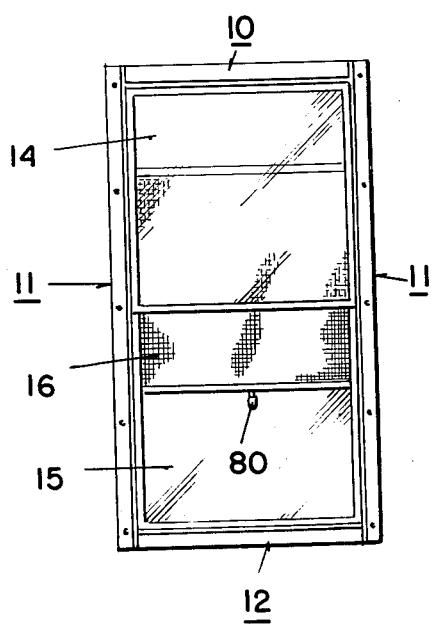
Figure 1 is an exterior elevation of the window.

My window includes a frame top or head 10 and two frame sides 11, all three being of identical cross section and a bottom rail 12, of sill shape. In this frame are mounted a top sash 14, a bottom or lower sash 15, and between these is located a screen sash 16, in Figure 1 shown as being moved part way into the storage space for it, located behind the upper sash 14.

Figure 2:
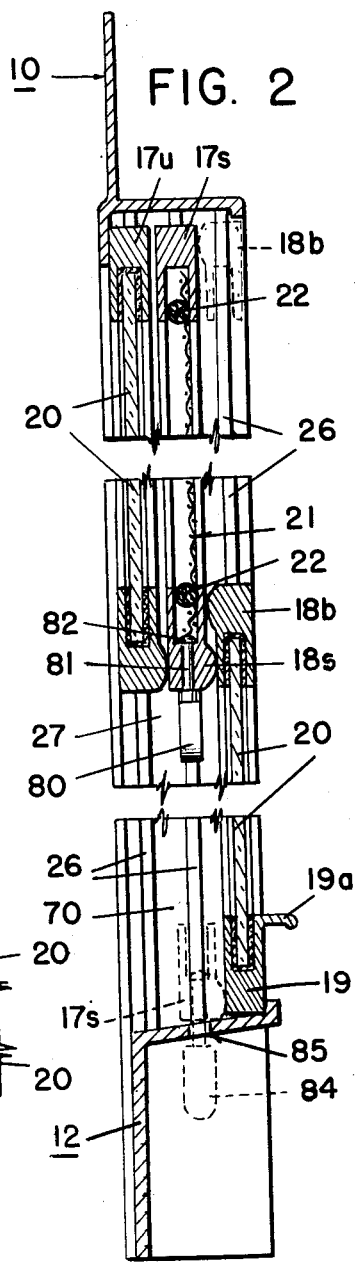
Figure 2 is a central vertical section.

Referring now particularly to Figure 2, each of the sashes has a top rail 17. Where it is convenient to distinguish between the various rails the top rail of the upper sash will be denoted 17u, the top rail of the screen 17s, and the top rail of the lower sash 18b. The corresponding lower rails are denoted generally by the numeral 18 and specifically the check rail of the upper sash is 18u, the bottom rail of the lower sash is 19 and the check rail of the screen is 18s.

These various rails may be of identical cross section but I prefer that the top rails 17 of the upper sash and the screen sash shall be smooth but the top rail 18b of the lower window shall correspond in cross section to the three check rails 18 having a slight bulge toward the adjacent sash so that the three sashes fit snugly together as best seen at the center of Figure 2. The bottom rail 19 of the lower sash is identical with the rail 17 except that it carries a convenient finger piece 19a for ease in raising and lowering this sash which obviously is the most used. The upper and the lower sashes each carry a pane of glass 20 and the screen sash carries wire cloth 21.

It is convenient to secure the wire cloth in the screen sash 16 by means of a vinyl rod 22 altho any other plastic material having the same properties could be substituted. The rod is made of sufficient softness so that the screen material 21 is at least partially imbedded in the rod 22 when the rod is driven in place in the channels of the rails and stiles of the screen sash 16. Once this rod is driven in place it remains in firm contact with the wire netting and the sash frame, keeping the wire cloth taut.

Figure 3:
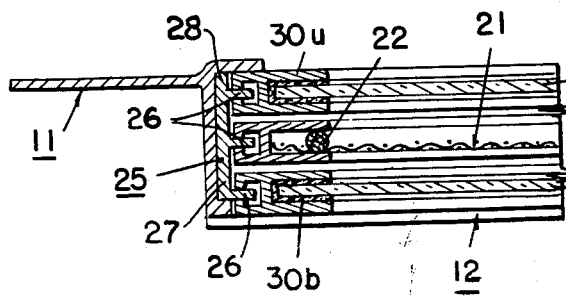
Figure 3 is a partial horizontal section.

Referring particularly to Figure 3, inside of the frame member 11 is an upper track 25 having three ribs 26 integral with and equally spaced on the track back 27. One of the ribs is flush with one edge of the back while the far rib is spaced inward a bit more than its own thickness from the spacing edge 28 of the track 25. The several stiles are denoted by the numeral 30 and specifically the stile of the upper sash is 30u, the stile of the screen sash is 30s, and the stile of the lower sash is 30b. Each of the stiles 30 carries a plurality of spaced bowed springs 31, the smaller sashes carrying but two while the larger may carry as many as six on each side. An edge view of spring 31 may be seen in Figure 4 indicating that it is flat strip material. One end of each spring may be secured to the stile in any manner as by spot welding or riveting, for example, so that its center bears against the edge of the rib 26. By means of these springs each sash is constantly held exactly centrally of the frame, the friction being just sufficient to hold it in such place without exerting any great amount of friction when the sashes are moved.

In Figure 4 there is shown a means for holding the upper sash in position and yet automatically releasing this sash from its latched position when the lower sash is moved to its extreme top position. The frame top 10 is joined to the frame side 11 partly by the rivets 32 and partly by a bracket 37 integral with the frame side 11 and formed of a portion of its side 33. This bracket is riveted as at 38 to the frame head 10. It is convenient to indicate the several portions of the cross section of the frame pieces 10 and 11, both being made from the same extended or rolled form. The top or side of this form is given the numeral 33 and has two down-turned lips, a front lip 34 and a rear lip 35 between which are received the track at the two sides. Integral with the frame section side 33 is a wide panel 36 which we may call the frame face. The rivets 32, which may be spot-welds, pass thru the front lip 34 of the side piece 11 and thru the vertical frame face 36 of the frame head 10.

To secure the upper sash in place there is an opening 40 thru both the upper track 25 and the side 33 of the side frame 11. A long leaf spring 41 is secured to the frame side 11 as at 42 and its free end carries a pair of spaced latches 43 which project thru the opening 40 to engage an angular notch 44 cut in the upper sash stile. As the upper sash is raised it will cam the spring away and will lock itself in position when the spring 41 moves to the normal position shown in full lines in Figure 4. The screen sash can move freely between the two spaced latches 43 but when the lower sash (which has no notch) is raised it will cam the spring outward into the dotted line position shown in Figure 4 at which time either sash can be moved. The lower sash is not latched in upper position and can be freely moved outward no matter what the position of the upper sash may be. Sometimes it is convenient to save a bit of metal and merely turn the free end of the spring inward. In this case, however, the screen sash must be cut away at the top following the sloping line of the notch 44 and then vertically upward. It is sometimes convenient to bevel or round off the upper corner of the lower sash the more conveniently to cam the spring outward whether it be a flat piece or have the two latches.

A very convenient manner of forming the corner of each sash is to cut off the two channel members 50 of the rail section 17 leaving a tenon 51 thru which a hole 52 is formed. This tenon 51 slides freely in the slot 54 in the stile 30 being formed by side members and the central bar 55, which divides the stile into the larger channel section 54 and the smaller section 56, having the two inwardly directed lips 57 between which is received snugly the rib 26 of the track 25. When the tenon 51 is snugly engaged in the recess 54, the side metal of the stile is punched into the hole 52 on each side, as indicated by the numeral 58, dotted in Figure 7 to show that the indentation 58 has not yet been made.

It is sometimes convenient to latch the lower sash in place independently of the other sash or sashes. A convenient latch is shown in Figures 8, 9 and 10 and consists merely in a small plate 60 loose and preferably spaced a bit from the plate 30 of the frame piece 11 but pivoting or camming on it. The plate is bent inwardly as at 61 and terminates in a finger piece 62. It has a hole thru which a rivet 65 loosely passes, the rivet being anchored in the side member 33 of the frame. A spring 66 preferably of spiral shape engages the rivet 65 and holds the plate against the frame member so that the inturned portion 61 slips in a notch 68 in the frame and in the side of the stile 30 which in this case would be the lower sash and consequently given the number 30b. The lower sash is readily moved by merely pressing the finger piece 62 to the right as seen in Figures 8 and 10.

For convenient movement of the screen sash 16 there is provided a pull-down member 80 having a stem 81 projecting loosely thru a hole in the lower screen rail 17s and having a head 82. The finger portion of this pull-down and lock is rectangular in section, as can be seen from the dotted position 84 at the bottom of Figure 2. In this dotted line position the pull-down and lock has passed thru an opening 85 in the sill member 12 which it may freely do but when the pull-down is turned at right angles it will lock the screen in lowered position since the portion 81 is free to rotate. It will be noted that each of the three sashes has a separate lock of its own and any one of the three can be operated independently of the other two.

In order to make it possible to remove any one of the sashes at will, the track is made in two sections, the upper portion 25 of which is permanently secured to the frame while the lower section 70 is entirely loose but is held in place against the side member 33 of the frame piece 11 by pressure of the spacing springs 31. The upper portions 25 of the track extends from the top just a little less than half way of the frame opening and the three ribs are cut off sharply as at 72 and the back 27 of the track is beveled as at 73 to a sharp edge 74. The lower track section 70 is beveled at 75 corresponding to the slope of 73 and its pointed end 76 is rounded off as best seen in Figure 6. The beveling of the lower track leaves the ribs 26 unsupported at their free ends, the back of the track being cut off as at 77 so that it is the ends of the ribs only that are rounded as at 76. The function of these parts will best be understood from a description of the assembly of the device.

The three members of the frame are cut from a rolled section, the head 10 being assembled with the two side pieces 11 by bending down the bracket piece 37 and spot-welding or riveting it to the side of the head 10, the side in this case being horizontal. The sill portion 12 completes the frame. Next the springs 41 are attached to the frame and the two upper tracks 25 are permanently attached to the frame extending a little less than half the way down. The frame with its track and spring is now turned upside down and the upper sash, the screen sash, and the lower sash are placed in the frame assembly, naturally upside down. The two bottom tracks 70 are now pushed in place, the rounded end 76 aiding in sliding the lower section 70 into position, and the unit is complete. The sashes so assembled are held firmly in place but can be pulled loose by first carefully lifting out the lower ends of the bottom track sections 70 for example after the window is in position in the home. The outside ribs 26 of the tracks are not used if there is no screen but when the screen is used it invariably slides on the center ribs 26.

If the housewife wishes to remove any sash, she merely elevates all three of the sashes to their uppermost position where they will easily be held by the spacing springs 31 even in absence of the upper sash lock 43. By gently pulling the bottom ends of the lower tracks 70 away from the frame they can be lifted out and then whichever sash is to be removed is lowered to its bottom position. As can be seen from Figure 3 this lowered sash can readily be pulled laterally, that is, inside of the room since the sash well clears the side rear lips 35 of the frame member. The preference is to make all of the metal pieces of aluminum but the tracks and spring 41 could be of steel, altho usually not, and the springs 31 and 66 would usually be of this material, and cadmium plated. In Figure 4 the spring 31 is shown as placed in a slot 87 in the stile, avoiding the need to spot-weld.

In Figure 13 a modified and often preferred form of leaf spring is illustrated. This spring 41a is of aluminum, about four inches long, and is welded to the frame. As previously mentioned, when this type of spring is used, the screen sash is cut away as at 88 and 89 and the lower sash is beveled as at 90 to form a camming surface.

In Figures 14 and 15 is illustrated a modified form of pull for the screen sash. This pull 80a has a threaded connection 93 with the screen check rail 18s and a reduced stem 94 which is caught by a latch 95 pivoted as at 96 to the sill or bottom rail 12 of the frame.

Figure 16 shows a modified form of triple track in which the ribs are a bit thinner and a relief of about .009" is provided at the usually flush side.

What I claim is:

1. In a window construction comprising a frame having spaced parallel vertically extending side members, a pair of upper and lower track sections arranged in end-to-end alignment inwardly along each frame side member and each comprising an outwardly facing base portion and a plurality of vertically extending parallel rails projecting inwardly of the frame, upper and lower sash members each having an area approximately one-half the area of said frame each slidably mounted on one of the rails of said track sections for vertical movement relative to each other in said frame, the upper track section of each pair being fixedly secured to the frame side members and having the lower end portion cut away and tapered downwardly and outwardly of the frame and terminating above the bottom edge of the sash members in the raised position thereof, the lower track sections each having the upper end of its base terminating short of the rails which project therebeyond and are tapered upwardly and inwardly of the frame for complementary overlapping engagement with the tapered lower end portion of the upper track section, and the extremities of the tapered upper ends of the rails of the lower track sections constituting cam portions for engagement with the tapered lower ends of the upper track sections to guide the upper ends of the lower track sections upwardly into positions intermediate the opposite side portions of the raised sash members and the tapered lower ends of the upper track sections as said lower track sections are moved outwardly into position against the frame side members when inserted therein.

2. In a window construction comprising a frame having spaced parallel vertically extending side members, a pair of upper and lower track sections arranged in end-to-end alignment inwardly along each frame side member and each comprising an outwardly facing base portion and a plurality of vertically extending parallel rails projecting inwardly of the frame, upper and lower sash members each having an area approximately one-half the area of said frame each slidably mounted on one of the rails of said track sections for vertical movement relative to each other in said frame, the upper track section of each pair being fixedly secured to the frame side members and having the lower end portion cut away and tapered downwardly and outwardly of the frame and terminating above the bottom edge of the sash members in the raised position thereof, the lower track sections each having the upper end of its base terminating short of the rails which project therebeyond and are tapered upwardly and inwardly of the frame for complementary overlapping engagement with the tapered lower end portion of the upper track section, the extremities of the tapered upper ends of the rails of the lower track sections constituting cam portions for engagement with the tapered lower ends of the upper track sections to guide the upper ends of the lower track sections upwardly into positions intermediate the opposite side portions of the raised sash members and the tapered lower ends of the upper track sections as said lower track sections are moved outwardly into position against the frame side members when inserted therein, and spring members mounted at opposite sides of said sash members and engageable with the rails of said track sections to maintain the sash members in their proper position relative to said track sections and to secure said sashes in any desired position relative to each other within said frame.

BENJAMIN M. ALTWIES.

References Cited in the file of this patent

UNITED STATES PATENTS

| Number | Name | Date |
|---|---|---|
| 250,562 | McCall | Dec. 6, 1881 |
| 300,881 | Masters | June 24, 1884 |
| 542,726 | Cleveland | July 16, 1895 |
| 817,461 | Adams | Apr. 10, 1906 |
| 1,481,775 | McKinnis | Jan. 22, 1924 |
| 1,487,335 | Jaeger | Mar. 18, 1924 |
| 1,497,204 | Bigham | June 10, 1924 |
| 1,506,960 | Watson | Sept. 2, 1924 |
| 1,706,347 | Brown | Mar. 19, 1929 |
| 1,711,670 | Brennan | May 7, 1929 |
| 1,730,757 | Casha | Oct. 8, 1929 |
| 1,906,153 | Hall | Apr. 25, 1933 |
| 2,156,964 | Biddle | May 2, 1939 |
| 2,207,213 | Atkinson | July 9, 1940 |
| 2,245,961 | Clay | June 17, 1941 |
| 2,262,670 | Ensminger | Nov. 11, 1941 |
| 2,291,726 | Kaufmann | Aug. 4, 1942 |
| 2,298,406 | Miller | Oct. 13, 1942 |
| 2,313,488 | Johanns | Mar. 9, 1943 |
| 2,326,549 | Miller | Aug. 10, 1943 |
| 2,350,689 | Long | June 6, 1944 |
| 2,361,882 | Smith | Oct. 31, 1944 |
| 2,433,835 | Beil | Jan. 6, 1948 |
| 2,463,432 | Russell | Mar. 1, 1949 |
| 2,467,511 | Van Fleet | Apr. 19, 1949 |
| 2,564,265 | Knott | Aug. 14, 1951 |

FOREIGN PATENTS

| Number | Country | Date |
|---|---|---|
| 228,350 | Great Britain | Feb. 5, 1925 |